United States Patent [19]

Pitt et al.

[11] Patent Number: 5,108,780
[45] Date of Patent: Apr. 28, 1992

[54] ENHANCED THERMOPLASTIC ADHESION TO FIBERS BY USING PLASMA DISCHARGE

[75] Inventors: William G. Pitt, Provo, Utah; John E. Lakenan, LaPlace, La.

[73] Assignee: Brigham Young University, Provo, Utah

[21] Appl. No.: 647,597

[22] Filed: Jan. 28, 1991

[51] Int. Cl.⁵ .............................................. B05D 3/06
[52] U.S. Cl. ................................... 427/40; 118/50.1; 156/272.6; 427/41; 427/322
[58] Field of Search ............... 156/272.6; 427/40, 41, 427/322; 118/50.1

[56] References Cited

U.S. PATENT DOCUMENTS

| | | | |
|---|---|---|---|
| 3,853,657 | 12/1974 | Lawton | 156/180 |
| 4,072,769 | 2/1978 | Lidel | 427/38 |
| 4,465,715 | 8/1984 | Manabe et al. | 427/40 X |
| 4,504,349 | 3/1985 | Ueno et al. | 156/272.6 |
| 4,606,930 | 8/1986 | Ueno et al. | 427/40 |
| 4,664,936 | 5/1987 | Ueno et al. | 427/38 |
| 4,756,925 | 7/1988 | Furukawa et al. | 427/39 |
| 4,900,388 | 2/1990 | Wyslotsky | 156/272.6 |

FOREIGN PATENT DOCUMENTS 2377414 8/1978 France .

Primary Examiner—Michael Lusignan
Attorney, Agent, or Firm—Thorpe, North & Western

[57] ABSTRACT

A device and method for enhancing adhesion between an embedded filler component and surrounding thermoplastic matrix which together form a composite material. The filler component is subjected to plasma discharge and subsequently maintained in an inert environment to protect the treated surface area against premature exposure to reactive substances. While maintained in this inert environment, the treated surface is coated with a thermoplastic polymer and solidified. This coated filler is then capable of processing into composite materials. The device comprises an enclosure which is adapted which includes a containment space and environment control for maintaining inert conditions during application of plasma discharge and coating with thermoplastic polymer.

21 Claims, 9 Drawing Sheets

Values of $L_{pc}$ from the single filament composite test data

| Sample (gas, trtmt. type, exp. time) | n | mean(mm) | St. Dev.(mm) | 95% confidence intervals upper(mm) | lower(mm) |
|---|---|---|---|---|---|
| Fiber A1 | | | | | |
| argon, A.Q., 0 seconds | 25 | 434.0 | 153.1 | 497.0 | 371.0 |
| argon, A.Q., 2.1 | 20 | 451.5 | 146.1 | 519.8 | 383.3 |
| argon, A.Q., 2.8 | 28 | 432.3 | 108.5 | 474.3 | 389.4 |
| argon, A.Q., 4.1 | 35 | 428.8 | 140.9 | 475.1 | 381.5 |
| argon, A.Q., 8.3 | 11 | 483.0 | 114.6 | 560.0 | 406.0 |
| Fiber A2 | | | | | |
| ammonia, A.Q., 0 seconds | 37 | 439.3 | 105.0 | 473.4 | 406.0 |
| ammonia, A.Q., 2.1 | 43 | 413.0 | 126.0 | 450.6 | 375.4 |
| ammonia, A.Q., 2.8 | 34 | 401.6 | 87.5 | 430.5 | 371.9 |
| ammonia, A.Q., 4.1 | 33 | 441.9 | 123.4 | 483.9 | 399.9 |
| ammonia, A.Q., 8.3 | 27 | 403.4 | 84.9 | 436.6 | 369.3 |
| Fiber A3 | | | | | |
| oxygen, A.Q., 0 seconds | 12 | 448.0 | 110.3 | 517.1 | 378.0 |
| oxygen, A.Q., 2.1 | 29 | 492.6 | 143.5 | 547.8 | 438.4 |
| oxygen, A.Q., 2.8 | 66 | 418.3 | 158.4 | 456.8 | 379.8 |
| oxygen, A.Q., 4.1 | 24 | 474.3 | 160.1 | 541.6 | 406.9 |
| oxygen, A.Q., 8.3 | 25 | 432.3 | 123.4 | 483.0 | 381.5 |
| Fiber D1 | | | | | |
| argon D1, D.C., 0 seconds | 35 | 307.1 | 107.6 | 343.0 | 272.1 |
| argon D1, D.C., 2.1 | 78 | 252.9 | 77.0 | 269.5 | 235.4 |
| argon D1, D.C., 4.1 | 49 | 256.4 | 82.3 | 280.0 | 233.6 |
| argon D1, D.C., 8.3 | 38 | 293.1 | 102.4 | 325.5 | 259.9 |
| Fiber D2 | | | | | |
| argon D1, D.C., 0 seconds | 20 | 539.9 | 182.9 | 624.8 | 454.1 |
| argon D1, D.C., 2.1 | 6 | 588.0 | 264.3 | 863.6 | 310.6 |
| argon D1, D.C., 2.8 | 17 | 532.9 | 175.9 | 623.9 | 442.8 |
| argon D1, D.C., 4.1 | 29 | 458.5 | 105.0 | 497.9 | 418.3 |
| argon D1, D.C., 8.3 | 10 | 465.5 | 149.6 | 572.3 | 358.8 |
| Fiber D3 | | | | | |
| ammonia, D.C., 0 seconds | 54 | 476.9 | 148.8 | 517.1 | 437.5 |
| ammonia, D.C., 2.1 | 60 | 467.3 | 128.6 | 499.6 | 434.9 |
| ammonia, D.C., 2.8 | 65 | 445.4 | 150.5 | 482.1 | 408.6 |
| ammonia, D.C., 4.1 | 56 | 438.4 | 163.6 | 487.4 | 401.6 |
| ammonia, D.C., 8.3 | 16 | 641.4 | 178.5 | 735.9 | 546.0 |
| Fiber D4 | | | | | |
| oxygen, D.C., 0 seconds | 41 | 300.1 | 83.1 | 325.5 | 274.8 |
| oxygen, D.C., 2.1 | 28 | 286.1 | 88.4 | 320.3 | 252.0 |
| oxygen, D.C., 2.8 | 61 | 257.3 | 79.6 | 277.4 | 238.0 |
| oxygen, D.C., 4.1 | 53 | 253.8 | 71.8 | 273.0 | 234.5 |
| oxygen, D.C., 8.3 | 40 | 347.4 | 70.9 | 369.3 | 325.5 |

Figure 4

Tensile data on untreated and plasma exposed Kevlar 49.

| Sample (gas, exp. time) | n | mean(g) | St. Dev.(g) | 95% confidence intervals upper(g) | lower(g) |
|---|---|---|---|---|---|
| Fiber N1 | | | | | |
| argon, 0 sec | 13 | 44.0 | 5.8 | 47.5 | 40.5 |
| argon, 2.1 | 12 | 45.8 | 8.8 | 51.4 | 40.2 |
| argon, 2.8 | 12 | 44.8 | 6.2 | 48.7 | 40.9 |
| argon, 4.1 | 13 | 45.6 | 5.0 | 48.6 | 42.6 |
| argon, 8.3 | 13 | 40.9 | 6.4 | 44.8 | 37.0 |
| Fiber N2 | | | | | |
| ammonia, 0 sec | 13 | 39.7 | 3.9 | 42.1 | 37.3 |
| ammonia, 2.8 | 12 | 38.6 | 4.9 | 41.7 | 34.7 |
| ammonia, 4.1 | 12 | 40.1 | 6.1 | 44.0 | 36.2 |
| ammonia, 8.3 | 13 | 38.3 | 4.4 | 41.0 | 35.6 |
| Fiber N3 | | | | | |
| oxygen, 0 sec | 13 | 38.1 | 5.9 | 41.7 | 34.5 |
| oxygen, 2.1 | 13 | 35.8 | 11.1 | 42.5 | 29.1 |
| oxygen, 2.8 | 13 | 41.9 | 4.6 | 44.7 | 39.1 |
| oxygen, 4.1 | 13 | 40.3 | 7.4 | 44.8 | 35.8 |
| oxygen, 8.3 | 12 | 42.6 | 7.8 | 47.6 | 37.6 |

Figure 5

ANOVA summary for tensile samples not exposed to plasma

| Independent variable | df | SS | MS | F-value | P-value |
|---|---|---|---|---|---|
| Fibers with no plasma exp. | 2 | 241.244 | 120.622 | 4.331 | 0.0206 |
| Residual | 36 | 1002.563 | 27.849 | | |

Dependent Variable: Mass at Break (g)

Figure 6

ANOVA Summary for Normalized Tensile Data

| Independent variable | df | SS | MS | F-value | P-value |
|---|---|---|---|---|---|
| Gas | 2 | 163.697 | 81.848 | 1.903 | .1524 |
| Exposure | 4 | 106.501 | 26.625 | .619 | .6496 |
| Gas Exposure | 7 | 511.431 | 73.062 | 1.699 | .1126 |
| Residual | 163 | 7010.899 | 43.012 | | |

Dependent Variable: Normalized Tensile Data

Figure 7

Kevlar 49 filament diameter

| Measurements | Method | Mean Diameter($\mu$m) | Upper Confidence Interval (95%) | Lower Confidence Interval (95%) | % Variation |
|---|---|---|---|---|---|
| 17 | SEM | 11.92 | 12.40 | 11.44 | ± 4.02 |
| 10 | SEM* | 12.21 | 12.64 | 11.78 | ± 3.51 |
| 10 | Microscope | 13.16 | 13.61 | 12.71 | ± 3.42 |
| 3 | Weighing | 11.98 | 12.00 | 11.96 | ± 0.20 |

\* Denotes SEM measurements taken after plasma processing.

Figure 8

Normalized Values of $L_{pc}$ Single Filament Composition Data

| Sample (gas, trtmt. type, exp. time) | n | mean(mm) | St. Dev.(mm) | 95% confidence intervals upper(mm) | lower(mm) |
|---|---|---|---|---|---|
| Fiber A1 | | | | | |
| argon, A.Q., 0 | 25 | 0 | 153.13 | 63 | −63 |
| argon, A.Q., 2.1 | 20 | 17.5 | 146.13 | 85.75 | −50.75 |
| argon, A.Q., 2.8 | 28 | −1.75 | 108.5 | 40.25 | −44.63 |
| argon, A.Q., 4.1 | 35 | −5.25 | 140.8 | 41.125 | −52.5 |
| argon, A.Q., 8.3 | 11 | 49 | 114.6 | 126 | −28 |
| Fiber A2 | | | | | |
| ammonia, A.Q., 0 | 37 | 0 | 105 | 34.12 | −33.25 |
| ammonia, A.Q., 2.1 | 43 | −26.2 | 126 | 11.375 | −63.88 |
| ammonia, A.Q., 2.8 | 34 | −37.63 | 87.5 | −8.75 | −67.38 |
| ammonia, A.Q., 4.1 | 33 | 2.625 | 123.38 | 44.625 | −39.38 |
| ammonia, A.Q., 8.3 | 27 | −35.88 | 84.875 | −2.625 | −70 |
| Fiber A3 | | | | | |
| oxygen, A.Q., 0 | 12 | 0 | 110.25 | 69.125 | −70 |
| oxygen, A.Q., 2.1 | 29 | 44.625 | 143.5 | 99.75 | −9.625 |
| oxygen, A.Q., 2.8 | 66 | −29.75 | 158.38 | 8.75 | −68.25 |
| oxygen, A.Q., 4.1 | 24 | 26.25 | 160.13 | 93.625 | −41.13 |
| oxygen, A.Q., 8.3 | 25 | −15.7 | 123.38 | 35 | −66.5 |
| Fiber D1 | | | | | |
| argon D1, D.C., 0 | 35 | 0 | 107.63 | 35.875 | −35 |
| argon D1, D.C., 2.1 | 78 | −54.25 | 77 | −37.63 | −71.75 |
| argon D1, D.C., 4.1 | 49 | −50.75 | 82.25 | −27.13 | −73.5 |
| argon D1, D.C., 8.3 | 38 | −14 | 102.38 | 18.375 | −47.25 |
| Fiber D2 | | | | | |
| argon D1, D.C., 0 | 20 | 0 | 182.88 | 84.875 | −85.75 |
| argon D1, D.C., 2.1 | 6 | 48.125 | 264.25 | 323.75 | −229.3 |
| argon D1, D.C., 2.8 | 17 | −7 | 175.88 | 84 | −97.13 |
| argon D1, D.C., 4.1 | 29 | −81.38 | 105 | −42 | −121.6 |
| argon D1, D.C., 8.3 | 10 | −74.38 | 149.63 | 32.375 | −181.1 |
| Fiber D3 | | | | | |
| ammonia, D.C., 0 | 54 | 0 | 148.75 | 40.251 | −39.38 |
| ammonia, D.C., 2.1 | 60 | −9.625 | 128.63 | 22.75 | −42 |
| ammonia, D.C., 2.8 | 65 | −31.5 | 150.5 | 5.25 | −68.25 |
| ammonia, D.C., 4.1 | 56 | −38.5 | 163.63 | 10.5 | −75.25 |
| ammonia, D.C., 8.3 | 16 | 164.5 | 178.5 | 259 | 69.125 |
| Fiber D4 | | | | | |
| oxygen, D.C., 0 | 41 | 0 | 83.125 | 25.375 | −25.38 |
| oxygen, D.C., 2.1 | 28 | −14 | 88.375 | 20.125 | −48.13 |
| oxygen, D.C., 2.8 | 61 | −42.88 | 79.625 | −22.75 | −62.13 |
| oxygen, D.C., 4.1 | 53 | −46.38 | 71.75 | −27.13 | −65.63 |
| oxygen, D.C., 8.3 | 40 | 47.25 | 70.875 | 69.125 | 25.375 |

A.Q. indicates that the fibers were "air quenched" for one hour before application of thermoplastic.
D.C. indicates that the fibers were "directly coated" with thermoplastic while still in the plasma reactor.

Figure 9

ANOVA Summary for Normalized $L_{pc}$ Data

| Independent variable | df | SS | MS | F-value | P-value |
|---|---|---|---|---|---|
| Gas | 2 | 166.438 | 83.219 | 0.418 | 0.6584 |
| Treatment | 1 | 154.779 | 154.779 | 0.778 | 0.3781 |
| Exposure | 4 | 3840.697 | 960.174 | 4.823 | 0.0007 |
| Gas Treatment | 2 | 3500.820 | 1750.410 | 8.793 | 0.0002 |
| Gas Exposure | 8 | 2309.323 | 288.665 | 1.450 | 0.1713 |
| Treatment Exposure | 4 | 4366.124 | 1091.531 | 5.483 | 0.0002 |
| Gas Treatment Exposure | 8 | 4001.782 | 500.223 | 2.513 | 0.0104 |
| Residuals | 1166 | 232118.220 | 199.072 | | |

Dependent Variable: Normalized $L_{pc}$ Data

Figure 10

The effect of processing parameters on $L_{pc}$ values

| Plasma Exposure Time | 2.1 sec | 2.8 sec | 4.1 sec | 8.3 sec |
|---|---|---|---|---|
| DIRECT COATING | | | | |
| Ammonia | - | - | - | 1,2,3 |
| Argon | - | - | 1,2,3 | - |
| Oxygen | - | 1 | 1,2,3 | 1 |
| AIR QUENCHING | | | | |
| Ammonia | - | - | - | - |
| Argon | - | - | - | - |
| Oxygen | - | - | - | - |

- Not a significant difference at the 0.05 level
1 Significant difference at the 0.05 level, Duncan New Multiple Range post-hoc
2 Significant difference at the 0.05 level, Tukey-Kramer post-hoc
3 Significant difference at the 0.05 level, Games-Howell post-hoc

Figure 11

| Plasma Power (W) | Exposure Time (s) | Exposure Energy (kJ) | Mean Load at Failure (g) | St. Dev. (g) | Significance level |
|---|---|---|---|---|---|
| 0 | 34 | 0 | 33.0 | 5.5 | ---- |
| 50 | 34 | 1.7 | 34.0 | 5.7 | none |
| 100 | 34 | 3.4 | 34.2 | 4.0 | none |
| 150 | 34 | 5.1 | 35.0 | 5.0 | none |
| 250 | 34 | 8.5 | 36.3 | 3.1 | none |
| 300 | 34 | 10.2 | 33.3 | 6.0 | none |
| 200 | 77 | 15.5 | 29.9 | 4.3 | <0.025 |
| 200 | 106 | 21.3 | 23.3 | 4.5 | <0.005 |
| 300 | 106 | 31.9 | 19.0 | 3.4 | <0.005 |

Figure 12

ENHANCED THERMOPLASTIC ADHESION TO FIBERS BY USING PLASMA DISCHARGE

BACKGROUND OF THE INVENTION

1. Field of the Invention

This invention relates to processing of fibers and thermoplastic polymers into composite materials which have increased adhesion between the fiber and the thermoplastic. More particularly, the present invention relates to the use of plasma discharge treatment of the fibers followed by immediate coating of the fibers with thermoplastic material prior to exposure of the fibers to other reactive substances.

2. Prior Art

Composite materials are structural materials composed of at least two distinct macroscopic components which are mixed together during fabrication to create materials with desired mechanical properties not present in either component alone. The two principal components of such composite materials comprise a matrix phase of thermoplastic or thermosetting resin and a fiber or filler which is embedded within the matrix.

During the last 30 years development of high strength and high stiffness fibers has enabled construction of very light, strong and stiff structural members which have been use in spacecraft and aircraft applications. Common examples of these high strength fibers include fiber glass, carbon graphite and polyaramid fibers. These fibers are typically much stiffer than the matrix and become the primary load bearing elements within the composite material because the embedded fibers or filler carry most of the applied load. Therefore, stability of the fiber within the matrix is essential. If there is not good adhesion between the matrix and the fiber (referred to hereafter as interfacial adhesion), the fiber will slip, shifting the load to the weaker polymer material making up the composite matrix. This may result in composite failure at less than its designated load capacity.

The prior art has generally recognized the importance of increasing interfacial adhesion in development of strong composite materials. This increased adhesion has typically been achieved by (i) roughening the fiber substrate as is disclosed in U.S. Pat. No. 4,664,936, (ii) inducing crystal nucleation at the fiber surface as occurs with polyetherether ketone on carbon fiber (*Polym. Eng. Sci.* 26: 633, 1986), (iii) modifying the surface energy of the fiber to promote better wetting by the matrix (U.S. Pat. No. 4,072,769), and (iv) formation of covalent chemical bonds between the fiber and matrix. All of these except matrix nucleation involve some kind of physical or chemical modification of the fiber surface. The effectiveness of these techniques will vary, depending upon the selection of matrix materials used in combination with the fiber.

Composite matrix materials are generally divided into two classifications: thermosetting and thermoplastic compositions. Thermosetting materials require chemical reactions to cure them from monomers into rigid, crosslinked polymeric materials. Common examples are epoxy, unsaturated polyester, phenolic, resorcinol-formaldehyde-latex, and urea-formaldehyde resins. Once these resins are cured, the chemical reactions cannot be reversed, and a composite structure cannot be reshaped or reprocessed. Most thermosetting composite materials tend to be brittle and more fragile than thermoplastic composites.

Thermoplastics are linear polymers which are solid at room temperature and can be melted at higher temperatures to facilitate processing into composite materials. They have several advantages over thermosetting resins such as toughness (not brittle), re-useability of scraps, no required curing reactions, indefinite shelf life and lower cost. The major disadvantage of thermoplastic resins is that they are unreactive toward forming chemical bonds with fibers. This lack of chemical reactivity gives thermoplastics good chemical and heat resistance, but poor interfacial adhesion. This poor interfacial adhesion has limited the utility of thermoplastics in high stress applications because reinforcing fibers tend to debond from the thermoplastic matrix. Thus there is a lack of available composite materials which are both tough and have good interfacial adhesion.

Prior art technology for enhancing adhesion between the fiber filler and thermoplastic matrix has been limited to a few specialized polymers which can crystalize or which have a particular surface energy. As was mentioned above, some increased adhesion to thermoplastics has been accomplished by inducing crystallization of the thermoplastic material at the fiber surface. Polyetherether ketone is an example of this type of composition and technique of enhancing adhesion. Some progress has also been made in modifying the wettability of the fiber. Here again, however, these techniques find limited application. What is needed is a useful technology of general application which can be applied to a wide range of thermoplastics for advancing interfacial adhesion.

As has been previously mentioned, improved covalent bonding between the filler and thermosetting resins has been realized. For example, fibers have been subjected to plasma discharge to develop chemical modification on the fiber surface. This chemical modification has been shown to improve wettability of the fiber with the matrix, as well as to create functional groups on the fiber which will react covalently with thermosetting matrix resins.

With respect to improving wettability, a prior art publication by Liston (*J. of Adhesion* 30: 119, 1989) has shown that treatment of several polymers, glass and fiberglass composites with various gas plasmas increases wettability toward water and epoxy matrix, and increases the bond strength with a thermosetting epoxy. Other studies have used oxygen, nitrogen and argon microwave plasmas on Kevlar (TM) to increase adhesion to a thermosetting triazine matrix material. (*J. of Appl. Polym. Sci.*, 26: 2087, 1981). In an example employing a thermoplastic matrix, Jang et al. used radio frequency in propylene gas to polymerize a thin coating of crosslinked propylene on Kevlar and carbon fibers (*Interfaces. in Polym., Ceramics and Metal Matrix Comp.*, vol. 1 pp. 319, 1988. When subsequently coated with a polypropylene matrix, the resulting composites showed up to 40% increase in interfacial adhesion which is attributed to increased wettability.

There are several technologies which use plasma to place specific chemical groups on fibers which react with epoxide groups to form covalent bonds between the fiber and the thermosetting matrix. *Molecular Characterization of Composite Interfaces*, discloses the exposure of Kevlar to radio frequency plasma in ammonia and monomethyl amine, placing a primary amine on the fiber which later reacted with an epoxy matrix and increased the composite strength. Similarly, 33rd Int. SAMPE SYMP. used ammonia plasma to place amine groups on polyethylene fiber which greatly increased fiber adhesion in epoxy composites. Carbon fiber and carbon black surfaces have been modified by plasma discharge in fluorocarbon gases and ammonia to place fluorite and nitrogen species on the surface which can improve adhesion to various polymers. *J. Mater. Sci.*, 22: 2937, 1987.

Accordingly, it is generally recognized that a plasma is useful in enhancing the wettability of both thermoplastic and thermosetting resins and in increasing the occurrence of covalent bonding of thermosetting resins at filament interfaces. The utility of plasma discharge with respect to these objectives is believed to arrive because of the generation of surface free radicals on the fiber or filler surface. For example, plasma discharge creates a plasma or ionized gas which is usually produced by the interaction of electromagnetic energy with the gas molecules. This electromagnetic energy may be supplied by direct current, shock waves, lasers, charged particle beams, neutral particle beams, etc. In addition to free electrons, plasmas may contain atomic or molecular ions, free radicals, neutral gas, or other electrically-neutral species.

Such plasma treatment is effective in creating a high density of free radicals on the surface of organic materials either by direct attack of gas-phase electrons, free radicals and ions, or photo decomposition of the surface by the vacuum-ultraviolet light generated in the plasma. These surface free radicals can then react with each other, with species in the plasma phase, or with molecules in the atmosphere such as $O_2$ once the surface is removed from the plasma environment. Such free radicals can remain at the surface for seconds or even hours if the material is kept in a vacuum. Clark, D.T. *Polymer Surfaces*. Residual radicals are usually quenched by atmospheric oxygen when the substrate is removed from the plasma reactor. These chemical reactions affect only the top ten nm of the substrate, leaving unchanged the bulk chemistry and the physical and mechanical properties of the material.

Although application of plasma to thermosetting and thermoplastic resins has generated some improvement in wettability, and some enhancement with respect to covalent bond formation with thermosetting materials, general application of this methodology for filler within a thermoplastic composite has not realized a significant level of commercial success. One reason for this nominal progress may be the weakening effect which plasma discharge has demonstrated with respect to fiber or filler. In many instances, as observed by the present inventors, the subjection of the fiber or filler to a plasma reduces the strength of the fiber or decreases the fiber diameter. In addition, the degree of improvement in interfacial adhesion with respect to thermoplastic materials has not been as promising as the application of plasma discharge to filler material used within thermosetting resins. In all of these prior art technologies, it is significant to note that the fiber or film was treated with plasma and subsequently removed from the plasma reactor before being coated with matrix material. This latter step of applying the matrix coating to the filler appears to have been accomplished in all instances external to the reactor.

OBJECTS AND SUMMARY OF THE INVENTION

It is an object of the present invention to provide a technique of general application with respect to composite materials made up of thermoplastics and filler wherein the surface of the filler is activated by a plasma discharge to improve adhesion between the thermoplastic and filler surface.

A further object of the present invention is to provide a treatment for the filler material surface wherein covalent bonds are formed between the filler and the thermoplastic composition, thus providing interfacial strength to a wide variety of thermoplastics.

It is a further object of this invention to provide a method of fabrication which enables continuous processing of fiber to be used as part of a thermoplastic composite, wherein the fiber has adhanced adhesion properties with respect to thermoplastic materials.

It is an object of the present invention to provide a technique for subjecting fibers or particulate filler material to a plasma discharge in a manner which generates free radicals on the fiber or filler surface yet does not reduce the strength of the fiber or decrease the fiber diameter.

It is yet another object of the present invention to generate free radicals on the surface of fiber or filler material which will react with the thermoplastic in a manner to form covalent bonds for increasing the interfacial strength of the composite thus formed.

These and other objects are realized in a method for enhancing adhesion between an embedded filler component and surrounding thermoplastic matrix which together form the composite material. The general method comprises the preliminary steps of (i) positioning the filler component within a controlled environment adapted for generation of a plasma discharge, (ii) generating a plasma discharge within the controlled environment as part of a plasma treatment with respect to an exposed surface area of the filler component, (iii) maintaining the filler and treated surface area in an inert environment to protect the treated surface area against premature exposure to reactive substances, (iv) coating the treated surface area of the filler with thermoplastic polymer in fluid state while maintaining protection of the treated surface with respect to other reactive substances, and (v) solidifying the thermoplastic polymer as a coating at the treated surface of the filler. This coated filler can then be processed in accordance with conventional steps for forming a composite of thermoplastic material with the embedded filler.

Other objects and features of the present invention will be apparent to those skilled in the art in view of the following detailed description, taken in combination with the accompanying drawings and charts.

DESCRIPTION OF THE DRAWINGS

FIG. 4 presents a tabulation of data representing values of $L_{pc}$ from single filament composite tests.

FIG. 5 presents a tabulation of tensile data on untreated and plasma exposed Kevlar 49.

FIG. 6 provides an ANOVA summary for tensile samples not exposed to plasma.

FIG. 7 provides an ANOVA summary for normalized tensile data.

FIG. 8 provides data relating to filament diameter for the Kevlar 49.

FIG. 9 presents normalized values of $L_{pc}$ from the single filament composite test data.

FIG. 10 provides an ANOVA summary for normalized $L_{pc}$ data.

FIG. 11 provides data illustrating the effect of processing parameters on $L_{pc}$ values.

FIG. 12 provides data showing the effect of exposure time and plasma field energy on exposed fibers.

DETAILED DESCRIPTION OF THE INVENTION

The present inventors have discovered that subjecting fiber or filler to plasma discharge enables formation of covalent bonds between the filler and the thermoplastic matrix, if the matrix is applied to the filler prior to exposure to air or to any other reactive species other than the thermoplastic.

Figure 1:
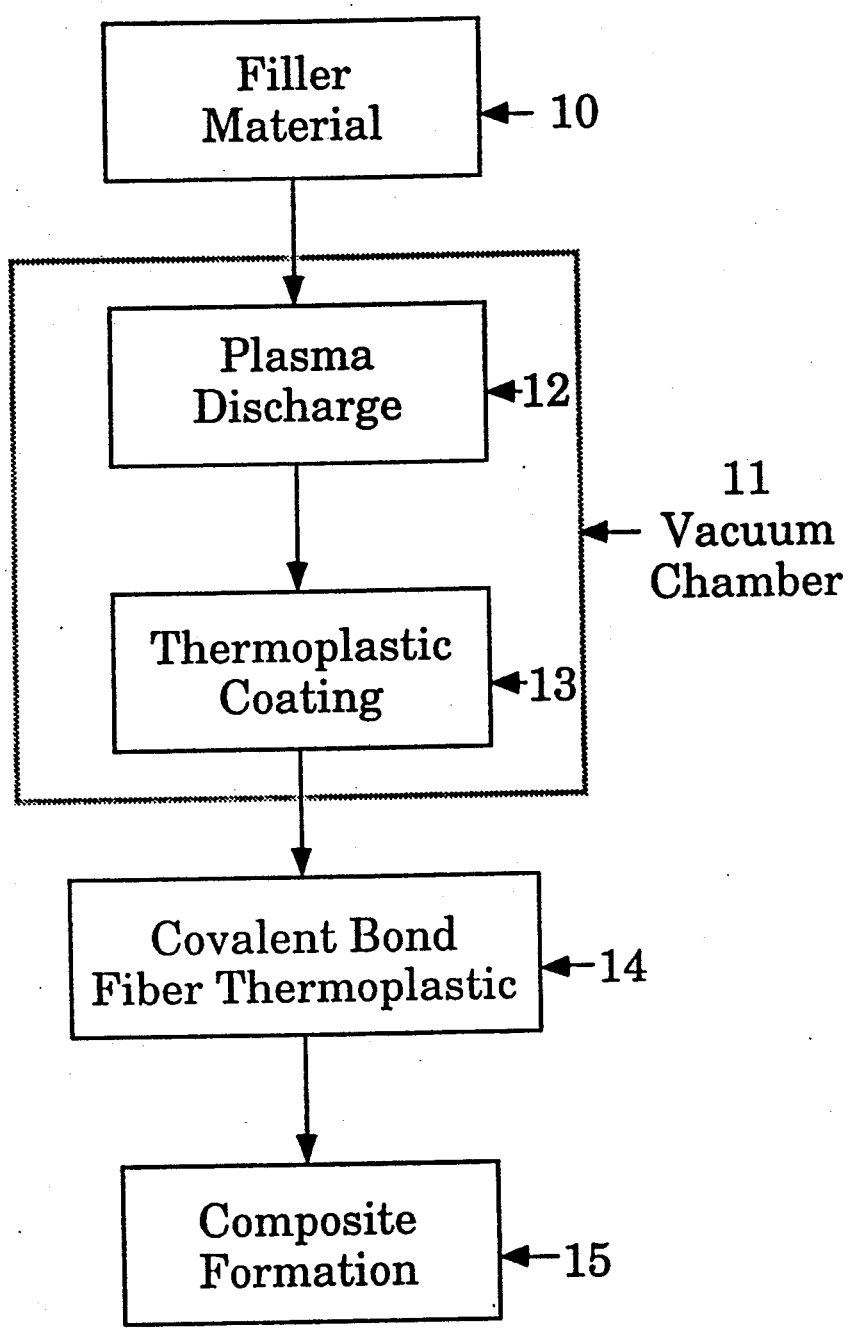
FIG. 1 shows in a block diagram illustrating the procedures of the present invention.

This general procedure is set forth in block diagram in FIG. 1. Filler 10 is positioned within a controlled environment such as a vacuum chamber 11 or some other form of enclosure which is adapted for generation of a plasma discharge 12. The plasma discharge 12 is generated within the vacuum chamber as part of a plasma treatment with respect to an exposed surface area of the filler component 10. This treated filler component is maintained within the vacuum chamber to protect the surface area against premature exposure to reactive substances. The filler is then coated with thermoplastic material 13 so that the treated surface area of the filler is protected. The thermoplastic coating 13 is typically applied in a fluid state and is subsequently solidified as a permanent coating for the filler.

The plasma discharge 12 is believed to generate free radicals on the filler which remain present on the surface for several seconds within the vacuum environment 11. When the fiber is coated 13 within a few seconds with thermoplastic material, the free radicals on the fiber extract a hydrogen atom from the thermoplastic which transfers the radical to the thermoplastic adjacent to the fiber. This radical in the thermoplastic can then react with another radical on the fiber surface which forms a covalent bond by combination of the two radicals. The formation of these covalent bonds across the interface significantly strengthens interfacial adhesion and improves the mechanical properties of the composite. More importantly, it has been discovered that this process accomplishes the desired covalent bonding without any significant reduction to fiber strength or decrease in fiber diameter. The resultant thermoplastic coated fiber 14 can then be stored and used in subsequent procedures of composite formation with a thermoplastic matrix 15. These methods may include any of the conventional molding procedures applied in the formation of thermoplastic reinforced composites.

Figure 2:
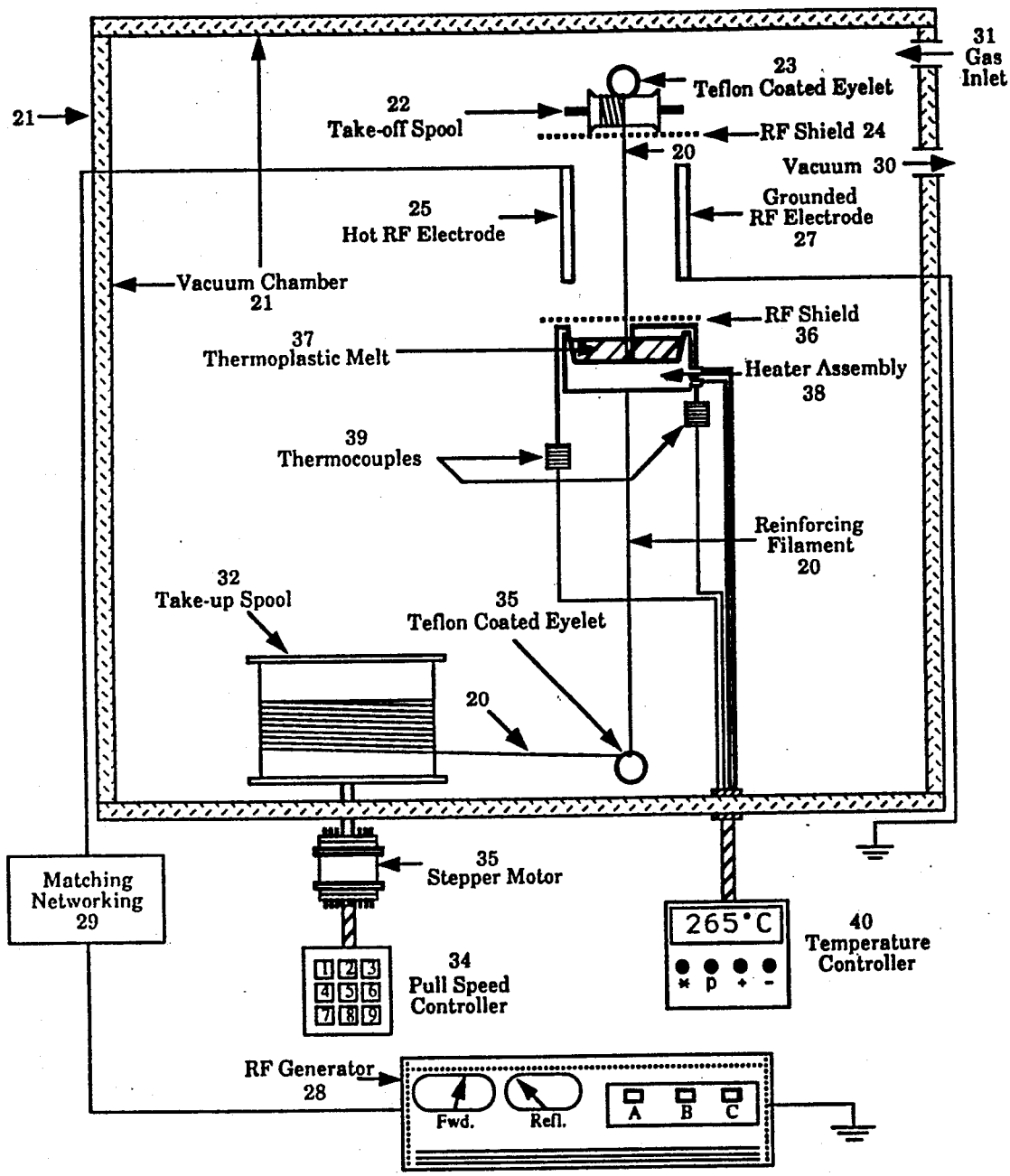
FIG. 2 represents a graphic illustration of a preferred embodiment of the present inventive method and device for applying a thermoplastic coating to a Kevlar filament.

FIG. 2 illustrates an apparatus for practicing the inventive method. This drawing shows a schematic of a device which processes a single reinforcing filament 20 which will be exposed to plasma and immediately coated with the thermoplastic resin in a continuous fashion. This total process is completed within a plasma reactor vacuum chamber 21 such as a Plasma Science PS 0500 plasma system. The fiber used in this embodiment was a reinforcing filament 20 taken from a spool of 195 denier, 134 filament, 0 twist, 968 KEVLAR 49 yarn obtained from DuPont. This was wound on a take-off spool 22 which supplied the filament through a teflon coated eyelet 23. KEVLAR 49 filaments were dried at 24° centigrade for 24 hours in a vacuum oven at 25 inches mercury vacuum, then stored in a vacuum desiccator with $CaSO_4$ desiccant. These drying procedures helped remove any adsorbed or absorbed water from the filaments to insure that no water was present in the vacuum chamber of the plasma reactor during processing. A RF shield 24 separated the takeoff spool 22 from respective hot 25 and grounded 27 RF electrodes as shown. This plasma reactor was powered by a 13.56 MHz RF generator 28 which was coupled to a matching network 29 for optimizing power input.

The vacuum chamber 21 was approximately 41 centimeters wide by 53 centimeters high by 75 centimeters deep. The vacuum environment was maintained with a conventional pump and valving system represented by vacuum arrow 30. Gases for plasma generation were supplied through gas inlet 31.

The opposing end of the filament 20 was attached to a take-up spool 32 which was coupled to a stepper motor 33. The stepper motor was controlled by microprocessor speed controller 34 which controlled the motor revolutions and motor speed. A second teflon coated eyelet 35 cooperated with the first teflon coated eyelet 23 to establish proper filament alignment. This alignment provided for passage through a first RF shield 24 into the volume between the plasma electrodes where the filament was subjected to plasma discharge. The respective electrodes 25 and 27 comprised two 8×8 cm aluminum electrodes which were separated by a distance of 8 cm.

The filament was then pulled vertically downward through a second RF shield 36 to a thermoplastic melt 37. This melt was maintained at 265° centigrade to apply a thin coating of matrix material comprising Lexan 121 polycarbonate supplied by General Electric. The Lexan had been similarly dried and stored to protect it from an accumulation of moisture. The desired temperature for the thermoplastic melt was maintained by a heater assembly 38 which was controlled by two J-type thermocouples 39 and regulated with a digital controller 40 using a proportional control algorithm.

After exiting the melt 37, the coated filament 20 continued vertically downward as the thermoplastic cooled and solidified. The coated filament was then redirected by the second eyelet 35 for collection on the take-up spool 32.

It will be noted that the total process of subjecting the filament 20 to plasma discharge and coating the treated filament in a thermoplastic melt was accomplished within the containment area or enclosed volume of the vacuum chamber 21. By virtue of this configuration, the treated filament was protected against reaction with unwanted reactive substances prior to receiving its thermoplastic coating. A Vacuum General feedback control system maintained the chamber pressure at a desired set point of approximately 100 torr by controlling a butterfly valve between the chamber and the mechanical pump generally represented by item 30.

The illustrated structure is representative of a more general description of an apparatus used for enhancing adhesion between filler and surrounding thermoplastic matrix wherein the apparatus comprises an enclosure 21 having a containment space and including means for maintaining a controlled environment suitable for protecting the filler component from exposure to reactive substances immediately after treatment of the filler to plasma discharge. Means 25 and 27 for subjecting the filler to plasma discharge is provided within the containment space of the enclosure 21. Coating means 37 is provided in communicating relationship with the containment space for coating the treated surface area of the filler with thermoplastic polymer in fluid state while maintaining protection of the treated surface with respect to other reactive substances. As will be shown hereafter, this coating means may actually be outside the vacuum chamber or enclosure 21; however, it must be communicating with the containment space for purposes of maintaining a controlled environment with respect to the treated filament surface until subjected to the coating means 37. The respective takeoff spool 22 and take-up spool 32 provide the appropriate fiber transport means which moves the filament through the reaction zone between electrodes 25 and 27, and through the thermoplastic melt 37.

Figure 3:
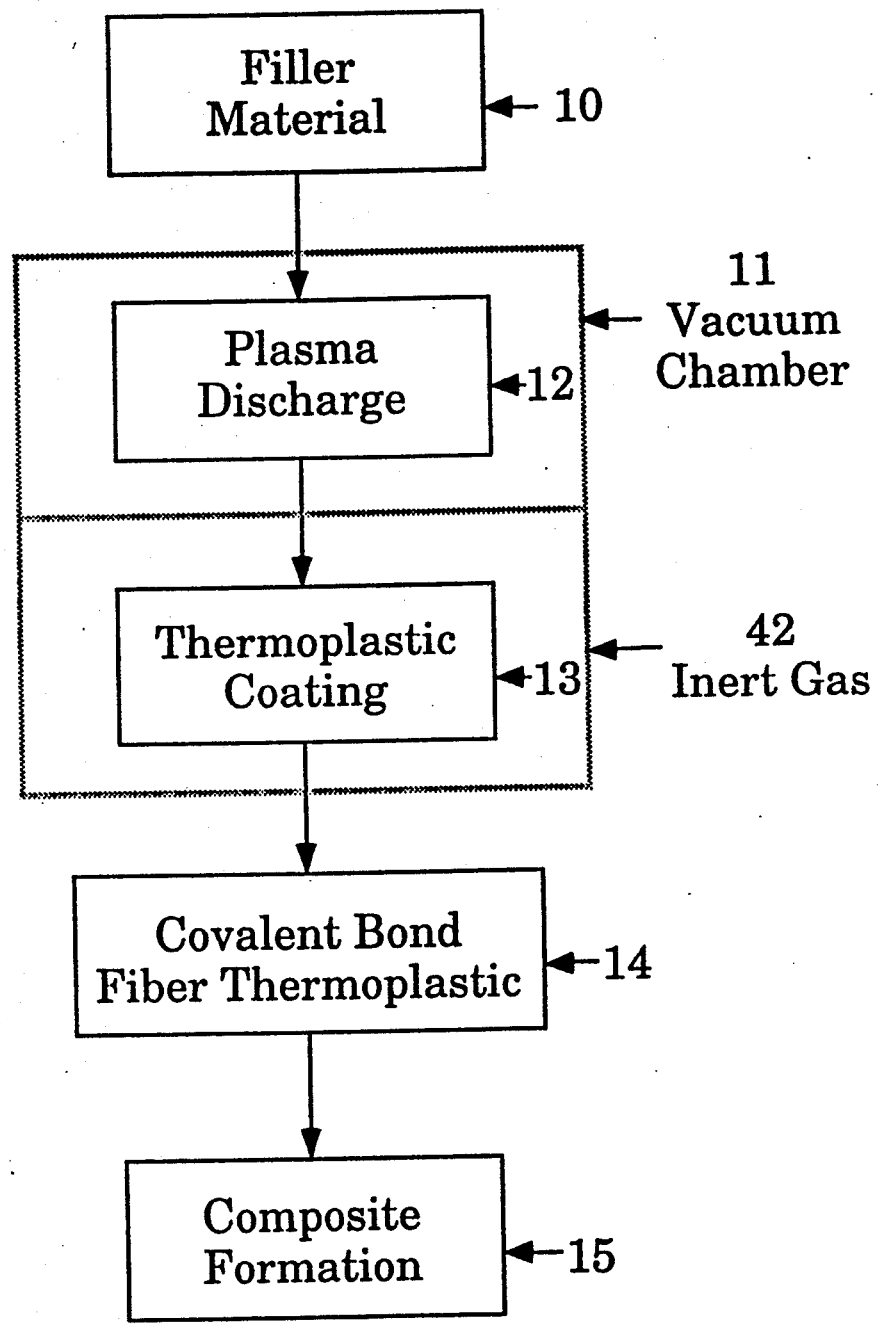
FIG. 3 illustrates an optional block diagram configuration wherein the filler material is stored external to the vacuum chamber.

FIG. 3 illustrates an optional configuration wherein the filler material is stored external to the vacuum chamber, which serves primarily as the plasma reaction chamber. This figure illustrates a modified methodology wherein the filler material or fiber filament 10 feeds on a continuous basis into the vacuum chamber 11, wherein it is subjected to plasma discharge 12 and then passed through a sealed exit port to a viscous thermoplastic melt 13 for coating as has been previously explained. The treated filament is protected within a controlled environment of inert gas 42 by maintaining the treated filler under an inert gas blanket pending coating of the filler with thermoplastic material, the free radical formation generated with the plasma discharge is maintained, thus developing covalent bonding with the thermoplastic coating material.

The above inventive methods were applied with respect to at least one example. The variables studies in this example were: plasma exposure time, delay time between plasma exposure and thermoplastic coating, and plasma gas species such as ammonia (99.5%), argon (99.99%) and oxygen (99.6%). The plasma exposure times were 0, 2.1, 2.8, 4.2, and 8.3 seconds which are referred to as exposures A, B, C, D, and E respectively hereafter. The thermoplastic coating or treatment type was either a direct coating (D.C.) in which the filament was coated with thermoplastic matrix immediately after plasma exposure, or air quench (A.Q.) in which the filaments were exposed to the plasma, and then removed from the vacuum chamber and stored in atmospheric air at approximately 680 torr, 25 degrees centigrade and 30 percent relative humidity for one hour prior to thermoplastic matrix application. This variable of treatment was used to determine if improvements in the interfacial adhesion were dependent on immediate thermoplastic application.

Parameters held constant during the plasma exposure and thermoplastic coating were: plasma power $24.0 \pm 1.0$ watts, plasma vacuum chamber pressure $0.100 + 0.005$ torr, gas flow rates, plasma vacuum chamber temperature $25 \pm 3$ C., and thermoplastic melt temperature $265 \pm 5$ C. Plasma power of 24 watts was the lowest value at which plasma could be maintained between the electrodes. Higher powers are possible but may lead to degradation of the physical properties of the fiber. The thermoplastic melt temperature of 265 C. provided the low melt viscosity necessary for the processing. The gas flow rates for ammonia and oxygen were 100 $cm^3$/minute. The flow rate for argon was 60 cubic centimeters per minute. The thermoplastic melt was approximately 0.3 centimeters deep, and the orifice in the melt pan through which the fiber was pulled was approximately 0.1 cm in diameter.

When the apparatus was aligned and threaded, the reactor chamber or vacuum chamber 21 was closed and evacuated to below 0.050 torr. When this pressure was reached, the flow of process gas was started at inlet 31 and the pressure was adjusted to 0.100 torr. Several minutes were necessary for the thermoplastic melt temperature to stabilize at 265 C. During this time the reactor chamber was purged with process gas. When the temperature of the melt had stabilized, the temperature controller was disconnected and the filament was pulled at 1.9 centimeters per second to produce 36 inches of processed filament. This was exposure A (0 seconds of plasma exposure).

The temperature controller was then reconnected. It was necessary for the temperature controller to be disconnected during the times when the plasma was active for electrical safety. To maintain conditions consistent with the plasma treatments it was disconnected during exposure A even though no plasma was generated. When the temperature of the melt was again stabilized at 265° C., the temperature controller was disconnected, plasma was generated and the same filament was pulled at 1.0 centimeter per second to produce 36 inches of filament processed at exposure E (8.3 seconds residence time in the plasma). The plasma was extinguished, and the temperature controller was reconnected. This process was repeated for pull speeds of 1.9, 2.9, and 3.9 centimeters per second in the For the air quenching treatment, the thermoplastic melt was absent during the initial plasma exposure. The plasma-exposed filaments were removed from the reactor and allowed to stand in the laboratory atmosphere for one hour. They were then threaded back through the apparatus and coated with thermoplastic using the same pull speed at which they were plasma treated. During these delayed coatings, no plasma was generated. However, the temperature controller was disconnected and reconnected as in the direct coating runs to maintain constant conditions with the exception of the time between the plasma exposure and the application of the thermoplastic. This process was repeated for each of the process gasses. A single filament was processed for each gas with the air quenched treatment and for each gas with the direct coating treatment. A replica run was performed for argon gas direct coating treatment.

A single filament composite test was used to evaluate interfacial adhesion in these samples. The test was performed by imbedding a single reinforcing filament in a dogbone-shaped matrix coupon and applying tensile stress to the dogbone in accordance with procedures outlined by Bascom and Jensen, *J. of Adhesion*, 19: 219, (1986). The tensile stress applied to the dogbone was transferred to the reinforcing filament because some finite value of filament-matrix interfacial sheer stress must exist. When the tensile stress transferred to the filament became great enough, deformation of the filament would occur. In previous literature brittle filaments have been used. Slight deformation of a brittle filament caused a fracture to occur. In a filament-matrix system with a brittle fiber the test is complete when the fiber is fully fragmented. The length of the longest fiber fragment is $l_c$, the filament critical length, and the length of the other fragments are distributed between $l_c$ and $l_c/2$. The relationship between 1 and interfacial shear strength is $$l_c = \frac{\sigma d}{2\tau} \quad (1)$$

where a is the fiber tensile strength and d is the fiber diameter. With either brittle or ductile filaments, the test is more easily performed with transparent matrix materials. With transparent matrices, polarizing filters can be used to determine the points of filament deformation. Stress birefringence patterns developed in the matrix at points where the filaments have been deformed. These patterns are useful for determining points of deformation as well as qualitatively estimating the magnitude of the interfacial adhesion. Birefringence patterns were used in this research to determine the points of ductile deformation. For ductile fibers the following modified equation is used:

$$L_{pc} = \frac{\sigma_d d}{2\tau_{pc}} \quad (2)$$

where $L_{pc}$ is the distance between birefringence points $O_d$, is the ductile yield stress of the fiber, and $T_{pc}$, is the interfacial shear strength between the ductile fiber and the thermoplastic matrix.

The polycarbonate-coated fibers were welded in polycarbonate dogbones cut from ⅛ inch Lexan sheet by painting a line of methylene chloride down the center of the dogbone and pressing the coated fiber onto the solvent line. The methylene chloride was allowed to evaporate for 24 hours at room conditions, with an additional 8 hours in a vacuum oven at 25 inches Hg vacuum, and 75 C. Two dogbones from each combination of processing variables were prepared and tested. In order to avoid experimenter bias, the samples were tested blindly by assigning a random number to each sample as it was formed. This number was the only identification of a specific sample until after the test was completed. The samples were placed under tensile stress and viewed under a microscope. The microscope had a ×10 eye-piece and a ×22 objective and was equipped with polarizing filters and a Polaroid camera attachment. The samples were elongated at a rate of approximately 0.9% strain per minute to a maximum of 8.0%. The stress concentration sites were viewed with a microscope at ×220 magnification. The distance between birefringence stress concentration sites ($L_{pc}$) was measured with a scale in the microscope eyepiece.

The results of the single filament composite test are shown in FIG. 4 which tabulates the 95% confidence intervals around the sample mean of the $L_{pc}$ lengths. The probability that the true mean of the population resides inside of the confidence interval is 95%. The 95% confidence interval was calculated using $$\text{Confidence interval} = X \pm t_{n-1}\left(\frac{s}{\sqrt{n}}\right) \quad (3)$$

where X is the sample mean, $t_{n-1}$ is a value from statistical tables from the 95% confidence interval, s is the sample standard deviation, and n is the sample size. The values represent the distance in microns ($10^{-6}$ m) between stress concentration sites on the stressed samples. The stress concentration sites mark the areas were ductile deformation of the Kevlar filament occurred. Note that the zero second exposure samples (no plasma treatment control samples) show difference $L_{pc}$ values which are attributed to different tensile strengths on each individual filament.

Recall that these $L_{pc}$ data do not give a direct measure of interfacial adhesion, but the $L_{pc}$ is related to interfacial shear strength, δ by Eq. 2 which also involves fiber diameter and fiber yield strength. The next sections present data showing that the fiber diameter, strength and surface roughness were not changed by the plasma treatment. However, the fiber strength was different from filament to filament before plasma treatment. Following those sections, a statistical analysis of variance test of the $L_{pc}$ data will show that for some plasma treatments, interfacial shear strength was increased when the fiber was immediately coated in the plasma reactor, but not when the fiber was exposed to air before coating with thermoplastic matrix.

Tensile tests were performed with an Instron Model 1122 tensile testing machine equipped with a 500 gram load cell. A full scale load of 100 grams was used with a crosshead speed of 5 mm/minute and a chart speed of 50 mm/minute. For these tests single Kevlar 49 filaments which were passed through the plasma at various speeds corresponding to the speeds at which different single fibers were treated and coated as described above. More specifically, a single continuous fiber was pulled between the plasma electrodes first with no plasma, and then with plasma present at speeds corresponding to residence times of 2.1, 2.8, 4.2, and 8.3 seconds which are referred to as exposures B, C, D, and E respectively. The sections with various exposure times were separated and cut into 10 mm segments for tensile testing. Each segment had polyethylene tape tabs placed 10 mm apart on each end to prevent the samples from slipping through the grips on the Instron. The results of the tensile measurements are shown in FIG. 5. In these tests, the Kevlar filaments failed in a ductile (as opposed to brittle) manner.

These results show that for a given single fiber, there is no statistically significant variation in tensile strength for the various plasma treatments on that fiber. However, comparison of the tensile strengths from fiber to fiber with no plasma treatment indicates that there is significant variation. FIG. 6 contains the results of an analysis of variance done on the independent variable of the different process gases (and therefore different fibers) without plasma exposure. The table shows that the tensile strengths were statistically different at the 0.05 significance level by virtue of the P-value being less than 0.05.

In these non-plasma samples, a section of filament was pulled through the apparatus in a specific low pressure gas atmosphere without generating plasma (0 second exposure). It was doubtful that simply the exposure to a low pressure gas could cause the differences observed in the tensile strength of these samples. Thus, the difference was attributed to the inherent variability in filament tensile strength which originated when the filaments were produced. All of the variations observed fell within one standard deviation of the mean filament tensile strength. The inherent variability was eliminated by subtracting the arithmetic mean of the tensile strength of each filament's exposure A (no plasma) sample from all other measurements taken on the same filament. The normalization procedure effectively slides all the filaments to a common starting point with the exposure A samples at a normalized tensile strength of zero. Normalization by subtraction was found to be superior over normalization by division because it maintained the relationship and magnitude of variances within the filament samples.

Once the data were normalized to account for inherent variability in filament tensile strength, the effects of the independent variables of plasma gas and plasma exposure on tensile strength were evaluated. FIG. 7 shows the results of a 2 factor ANOVA performed on the normalized tensile data.

The ANOVA analysis confirms that neither independent variable (gas species or exposure time) caused a significant difference in the filament tensile strength, nor did the combination of the two. In other words, the filament tensile strength was not significantly affected by the processing parameters. Therefore, the arithmetic mean of all the filament tensile measurements was used as the average filament tensile strength in subsequent calculations.

The topography of Kevlar filaments was examined using a Jeol JSM-840A scanning electron microscope. The SEM samples were prepared by mounting Kevlar filaments on a 25×25 mm microscope slide with double-sided tape. Tape strips were placed parallel to each other on opposite edges of the top side of the cover slip. The tape strips were 2.5 mm wide which left a 20 mm observation length across the cover slip where the filaments were not exposed to tape. The cover slip was mounted on an SEM stub with double-sided tape. Silver paint was applied to the top of the cover slip at each corner and extended on the bottom side of the cover slip at each corner to the SEM stub. The samples were sputter coated with a 80-100 A layer of gold.

The SEM micrographs showed small flaws such as fibrils, grooves, and gouges were randomly distributed along the filaments. Some sections of filaments had extensive mechanical damage which occurred randomly. Qualitatively, no differences were noted in the average topological appearance of processed and unprocessed filaments.

The Kevlar 49 filaments which were not exposed to plasma were photographed under a light microscope at magnifications of ×740, and ×1850. The microscope had an eye pieced power of ×12.5 and objectives of ×40 and ×100. An additional magnification of ×1.48 was introduced with the camera.

The average diameter of a single filament from the spool of Kevlar 49 yarn was determined from SEM micrographs, from optical micrographs, and from weighing a known length of the 134 filament yarn. Each length of yarn was wound on a preweighed paper spool. The mass of each sample was determined to 0.0001 g on a Sartorius analytical balance. Care was taken to avoid contamination of the spool with foreign matter. The SEM photos were taken of Kevlar filaments before and after plasma treatment to determine if the processing affected the filament diameter.

The results of the determination of the Kevlar 49 filament average diameter are shown in FIG. 8. The weighing method showed a small amount of variability which suggested that it was a good technique for determining the average diameter. The SEM micrographs showed no evidence of reduction in diameter due to plasma processing.

The arithmetic mean of the values for the filament diameter determined by the weighing method were used to estimate the average filament diameter of $d = 11.98 + 0.02$ $\mu$m. The SEM and light microscope photos showed that the filament to filament variations in diameter were ±4.47% and ±3.77% (95% confidence intervals) respectively. Therefore, the inherent variability in filament diameter could at most account for a 4.5% variation in the observed value of $L_{pc}$. Recall that filaments showed no change in diameter after plasma exposure for any of the plasma treatments investigated in this study. Thus, plasma exposure was not responsible for any reduction in filament diameter, but small filament to filament variations in diameter were inherent in the unprocessed fibers.

In summary the value of $L_{pc}$ is dependent on the filament diameter, filament tensile strength, and fiber-matrix interfacial adhesion. The previous sections establish that variations in d could account for at most 4.5% variation in values of $L_{pc}$ and that filament to filament variations in strength exist but can be accounted for by considering the non-plasma-treated fiber. Once the data were normalized for variation in filament strength, the observed differences in $L_{pc}$ were attributed to differences in interfacial shear strength.

The $L_{pc}$ data form a statistical sized sample with 1196 data points. Since the filament to filament variation in tensile strength influences the values of $L_{pc}$ the $L_{pc}$ data were normalized by the same procedure used to normalize the tensile data (subtraction method). Specifically, the inherent variability in $\delta$ was eliminated by subtracting the arithmetic mean of the $L_{pc}$ of each filament,s non-plasma exposure from all other measurements taken on the same filament. The normalization procedure effectively slides all the $L_{pc}$ data to a common starting point with the non-plasma samples at a normalized $L_{pc}$ of zero. The normalized $L_{pc}$ data are given in FIG. 9.

The repeatability of the $L_{pc}$ data may be evaluated by considering fibers D1 and D2 which are replicates of argon plasma treatment on Kevlar followed by immediate coating with thermoplastic. A 2-factor ANOVA showed that there was no significant difference in $L_{pc}$ between these two data sets. Therefore, the data from filament D1 and filament D2 samples were combined in subsequent analysis.

The effects of the independent variables of plasma gas species, plasma exposure time, and treatment type (direct or delayed coating), were determined by means of a 3-factor ANOVA. The results of the ANOVA are summarized in FIG. 10 which shows that the main effect of plasma exposure time was statistically significant at the 0.05 level. In addition to the two-way interactions of gas treatment and treatment exposure, the three-way interaction of gas treatment exposure was also found to be statistically significant. Because the three-way interaction was significant, it took precedence in the analysis. Its significance indicated that all the independent variables must be considered when attempting to find a minimum value of $L_{pc}$. It was necessary to break down the three-way interaction to determine which of the combinations of variables were significantly different from others. A 1-factor ANOVA was performed on each of the filament samples. It was found that none of the variables, when associated with the air quench treatment, produced $L_{pc}$ values which were significantly different from others. For the samples coated immediately with thermoplastic the significance of the differences between untreated samples and the samples with various treatment times are summarized in FIG. 11. A numeral in the table indicates the type for post-hoc procedure which found the $L_{pc}$ values to be significantly different.

The Duncan post-hoc is the most liberal in assigning significance while the Games-Howell is the most stringent in assigning significance. Because of this, only the combinations which had significance indicated by more than one Post-Hoc procedure were considered truly significant. The post-hoc analyses on the 1-factor ANOVA results showed that for any plasma gas with the direct coating treatment, different plasma exposure times produced significant changes in the values of $L_{pc}$. The set of parameters which displayed the largest decrease in the value of $L_{pc}$ was argon plasma, direct coating, and plasma exposure D(4.1 second exposure). These processing parameters resulted in a 16.4% decrease in the observed $L_{pc}$ compared to that of argon plasma, direct coating, and plasma exposure A (no plasma). Oxygen plasma, direct coating, and exposure D showed a 15.5% decrease in the observed $L_{pc}$ compared to its respective A exposure value. The $L_{pc}$ values 4.1 sec of oxygen and argon plasma were not significantly different. Therefore, it was concluded that either argon or oxygen plasma with the direct coating treatment and exposure D produced the greatest reduction in observed $L_{pc}$ values (16%). Other gases such as carbon dioxide and nonsaturated organic gases (having at least one double bond) form effective plasmas.

A key aspect of this invention is that immediate coating of the plasma treated fiber with the thermoplastic produces stronger interfacial shear strength than when the fiber is exposed to air or other free-radical-quenching species before it is coated. The data set strongly supports this aspect of the invention. In the case where the fiber was treated with plasma and then exposed to air before being coated with thermoplastic, none of the samples displayed any interfacial shear strength which was statistically different than the samples prepared without plasma exposure. This is an interesting observation since there are several reports (see U.S. Pat. Nos. 3,853,657; 4,756,935; 4,606,930; 4,504,349; 4,072,769) that plasma treatment increases adhesion in polymeric systems, and all this previous work followed the protocol of removing the fibers from the plasma reactor prior to coating. In these previous reports, improved adhesion was NOT attributed to covalent bond formation with thermoplastic, but was attributed to 1) cleaning of the fiber surface, 2) an increase in the surface energy of the fiber which increased wettability with the matrix, or 3) formation of bonds with thermosetting (not thermoplastic) matrixes.

In the example of the present invention, the Kevlar fiber was kept extremely clean, thus any additional surface cleaning by the plasma may not have added to adhesion already present. Also Kevlar has a fairly high surface energy and thus the plasma treatment may not have raised the surface energy sufficiently to significantly increase adhesion. Also note that in these previous descriptions, the plasma power and treatment time was significantly greater than that described in this example; the less reactive plasma treatment in this example may not have placed a sufficient amount of new chemical species on the surface to significantly change the wettability. In CASING (Cross-linking by Activated Species of Inert Gases, see J. Appl. Polym. Sci., 1461, 1967) applications of plasma treatment sufficient free radicals are generated on the polymer surface to crosslink the surface, but not change the surface wettability.

In the experiments in which the fiber was immediately coated with thermoplastic in the plasma reactor, there were statistically significant changes in interfacial shear strength compared to the control samples which had no plasma treatment. At 2.1 and 2.8 seconds of exposure, the $L_{pc}$ decreased (the average interfacial shear strength increased) but only for oxygen was this decrease significant at the 0.05 level. At 4.1 seconds, the $L_{pc}$ decreased even more, with oxygen and argon treatments producing significant differences at the 0.05 level. At 8.3 seconds of plasma treatment, the $L_{pc}$ increased from that at 4.1 seconds, indicating that the interfacial shear strength was decreasing.

Long plasma treatment apparently decreases adhesion rather than increase it. This shows that plasma treatment parameters need to be fine tuned to the correct operating window in order to produce optimal adhesion with thermoplastics. This data also shows that the plasma gas must be carefully selected. Argon and oxygen appear to work better than ammonia in promoting higher interfacial shear strength between Kevlar and polycarbonate. Other plasma gases may be optimal for other fibers and other thermoplastics.

Variation between filament diameters could account for as much as 4.5% of the observed 16% decrease in the value of $L_{pc}$. The filament tensile strength was unaffected by the processing parameters and inherent variations between filaments were eliminated by normalization. The variations in strength and diameter cannot account for the differences observed in $L_{pc}$ data. Therefore, the filament diameter and filament tensile strength were assumed to be relatively constant along the length of a given filament, and decreases in $L_{pc}$ are attributed directly to increases in interfacial shear strength, $t_{pc}$. Upon processing, the Kevlar 49 filaments showed no appreciable change in surface topography as revealed with SEM. This, along with the fact that the direct coating parameter was essential in causing changes in the values of $L_{pc}$ rule out mechanical interactions as a possible source of the changes in $t_{pc}$.

In summary, the $L_{pc}$ data indicated that the interfacial adhesion was increased by about 16% for the combinations of argon or oxygen plasma with direct coating, and 4.3 sec exposure to 24 Watt plasma. The $L_{pc}$ data indicated that the processing technique proposed in this work could be used to increase the filament-matrix interfacial adhesion in thermoplastic composites. Without the direct coating treatment, no statistically significant changes were noted in the values of $L_{pc}$.

It was the object of the processing technique to produce free radicals on the Kevlar 49 surface, and then to quench those free radicals with the thermoplastic matrix material, thus forming covalent bonds across the filament-matrix interface. There has been no technique developed which would allow direct measurement of chemical bonds across the filament-matrix interface. However, the dependence of the variations in $t_{pc}$ on the direct coating treatment supports the hypothesis that bonds are found at the interface. Furthermore, plasma processing produces an effect at the filament surface which is lost after the filaments are exposed to the atmosphere for one hour. The change in $t_{pc}$ can be attributed to chemical bond formation for two reasons. The first is that additional filament-matrix mechanical interactions due to roughening of the surface is absent and cannot be the source of the changes. The second reason was that the effect of the plasma processing was transient, suggesting that free radicals were involved in bond formation.

A proposed mechanism of bond formation is that the plasma generates a filament radical on the terephthalate ring. This is where the radical would be most stable because of resonance structures. A radical could also be generated on the dianaline ring or on the amide nitrogen, but these radicals would not be as favorable from a resonance stabilization standpoint and would not be formed as frequently. Following radical formation on the fiber, this radical extracts a hydrogen atom from the thermoplastic as it is coated. This transfers the radical to the polycarbonate. The final step occurs when a second filament radical and a matrix radical meet to form a covalent bond.

During the course of experimentation, the present inventors became aware that exposure time and energy levels also affected the strength of fibers processed by this method. Several experiments were conducted to determine the amount of plasma exposure required to degrade the tensile load properties of the Kevlar single filaments in order to ensure that the operating conditions producing increased adhesion described in this disclosure were not also reducing fiber strength. A single fiber was pulled between the plasma electrodes without the thermoplastic melt present. Several plasma powers and fiber residence times were explored. The results are presented in FIG. 12. This data shows that the tensile load that the fiber can support is not reduced until the total plasma exposure energy (exposure time multiplied by power) exceeds 15.5 kJ. Only beyond this exposure energy is the tensile load reduced significantly from that of the unexposed fiber. Therefore proper control of exposure time and plasma energy is essential for preserving fiber strength.

It is to be understood that the preceding examples are by way of illustration of the inventive aspects set forth in the following claims, and are not to be construed as limiting the scope of the claimed invention.

We claim:

1. A method for enhancing adhesion between an imbedded filler component and surrounding thermoplastic matrix which together form a composite material, said method comprising the preliminary steps of:
   (1.1) positioning the filler component within a controlled environment adapted for generation of a plasma discharge;
   (1.2) generating a plasma discharge within the controlled environment as part of a plasma treatment with respect to an exposed surface area of the filler component;
   (1.3) maintaining the filler and treated surface area in an inert environment to protect the treated surface area against premature exposure to reactive substances;
   (1.4) coating the treated surface area of the filler with protection of the treated surface with respect to other reactive substances; and
   (1.5) solidifying the thermoplastic polymer as a coating at the treated surface of the filler.

2. A method as defined in claim 1, further comprising the step of forming the composite material by molding the filler treated in accordance with the steps of claim 1 with a thermoplastic polymer which is compatible with the thermoplastic polymer applied as a coating to the filler.

3. A method as defined in claim 1, wherein step 1.2 comprises the more specific step of generating a radio frequency plasma discharge within the controlled environment for treating the exposed surface area of the filler.

4. A method as defined in claim 3, comprising the more specific step of applying a gas plasma discharge to the filler wherein the gas is selected from the group consisting of argon, oxygen, helium, ammonia, carbon tetraflouride, carbon dioxide, organic unsaturated gases and any combination thereof.

5. A method as defined in claim 3, comprising the more specific step of applying a gas plasma discharge to the filler wherein the gas comprises argon.

6. A method as defined in claim 3, comprising the more specific step of applying a gas plasma discharge to the filler wherein the gas comprises oxygen.

7. A method as defined in claim wherein the filler comprises reinforcing fibers to be imbedded within the thermoplastic matrix, said method comprising the more specific steps of:
   (7.1) feeding fibers within the controlled environment to a plasma reactor wherein a processing gas is maintained at low pressures suitable for plasma discharge;
   (7.2) treating the fibers with plasma discharge within the reactor;
   (7.3) withdrawing the treated fibers from the reactor while maintaining said fibers within the controlled environment as protection against reactive substances; and
   (7.4) applying a thermoplastic coating to the treated fiber upon withdrawal from the plasma reactor and while said fibers are yet in the controlled environment.

8. A method as defined in claim 7, wherein the step of feeding fibers to the plasma reactor comprises the specific step of:
   (8.1) spool feeding a continuous strand of fiber through a sealed entry port into the reactor;
   (8.2) treating the fiber with plasma discharge;
   (8.3) passing the treated fiber through a sealed exit port from the reactor and immediately through a viscous thermoplastic melt to coat the fiber with thermoplastic resin prior to exposure to other reactive substances; and
   (8.4) collecting the treated and coated fiber on a takeup spool.

9. A method as defined in claim 1, wherein the controlled environment is accocmplished by maintaining a vacuum environment which protects the treated filler from exposure to reactive substances until after the filler is coated with thermoplastic.

10. A method as defined in claim 1, wherein the controlled environment is accocmplished by maintaining an inert gas environment which protects the treated filler from exposure to reactive substances until after the filler is coated with thermoplastic.

11. A method as defined in claim 1, wherein the steps are applied as part of a process for creating covalent bonding between the filler and the coating of thermoplastic polymer.

12. A method as defined in claim 1, wherein the filler is selected from the group consisting of carbon, glass, organic polymeric fiber, inorganic polymeric fiber and natural fiber.

13. A method as defined in claim 1, wherein the filler is processed within the identified steps in a form selected from the physical forms consisting of single fiber, multifilament tow, woven fabric, sheet, film chopped fiber, and particulate.

14. A method as defined in claim 1, wherein the step of generating a plasma discharge is accomplished by use of a plasma generation process selected from the group consisting of microwave, A.C., D.C. and laser induced processes.

15. A method for enhancing adhesion between an imbedded filler component and surrounding thermoplastic matrix which together form a composite material, said method comprising the preliminary steps of:
- (15.1) subjecting the filler to plasma discharge within a controlled environment which protects against exposure to unwanted reactive substances; and
- (15.2) immediately coating the filler with a layer of thermoplastic material while maintaining the filler within the controlled environment.

16. A method as defined in claim 15, comprising the more specific steps of:
- (16.1) subjecting the filler to plasma discharge within a plasma reactor;
- (16.2) removing the filler from the reactor under an inert gas blanket to protect against exposure to unwanted reactive substances; and
- (16.3) coating the filler with thermoplastic material while maintaining the protection of the inert gas blanket.

17. A device for enhancing adhesion between a filler component and surrounding thermoplastic matrix comprising:
- (17.1) an enclosure having a containment space and including means for maintaining a controlled environment suitable for protecting the filler component from exposure to reactive substances immediately after treatment of the filler to plasma discharge;
- (17.2) means for subjecting the filler to plasma discharge within the containment space; and
- (17.3) coating means within the containment space for coating the treated surface area of the filler with thermoplastic polymer in fluid state while maintaining protection of the treated surface with respect to other reactive substances.

18. A device as defined in claim 17, wherein the containment space comprises a vacuum chamber which includes a plasma discharge reactor within its contained space.

19. A device as defined in claim 18, further comprising containment means for a thermoplastic melt, said melt containment means being supported within the containment space.

20. A device as defined in claim 19, further including fiber transport means comprising:
- (20.1) a takeoff spool for feeding filler fiber to the plasma discharge means;
- (20.2) fiber passage means coupled within the coating means for passing fiber through the thermoplastic polymer of the coating means; and
- (20.3) a takeup spool for collecting the fiber after receiving its coating of polymer.

21. A device as defined in claim 20, wherein all components of the device are contained within the enclosure and are configured as part of a continuous processing system wherein fiber from a takeoff spool is continuously fed along the transport means, being sequentially subjected to plasma discharge and immediate coating with thermoplastic polymer prior to collection on the takeup spool.

* * * * *